(12) United States Patent
Tatsuura et al.

(10) Patent No.: US 6,985,652 B2
(45) Date of Patent: Jan. 10, 2006

(54) OPTICAL SWITCHING DEVICE AND OPTICAL DEVICE

(75) Inventors: Satoshi Tatsuura, Ashigarakami-gun (JP); Minquan Tian, Ashigarakami-gun (JP); Makoto Furuki, Ashigarakami-gun (JP); Izumi Iwasa, Ashigarakami-gun (JP); Yasuhiro Sato, Ashigarakami-gun (JP); Hiroyuki Mitsu, Ashigarakami-gun (JP); Takashi Matsubara, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 36 days.

(21) Appl. No.: 10/782,796

(22) Filed: Feb. 23, 2004

(65) Prior Publication Data

US 2005/0069241 A1    Mar. 31, 2005

(30) Foreign Application Priority Data

Sep. 25, 2003  (JP) ............................. 2003-332957

(51) Int. Cl.
G02B 6/26  (2006.01)
G02B 6/42  (2006.01)

(52) U.S. Cl. .............................. 385/16; 385/1; 385/11; 385/141; 359/279; 359/321; 359/484; 359/589

(58) Field of Classification Search .......... 385/12–131, 385/141–145, 1–3, 11; 398/43, 45–48, 52–54; 372/38.03; 549/304–307; 359/237–238, 359/279, 300, 321, 483–484, 577, 580, 583, 359/589
See application file for complete search history.

(56) References Cited

U.S. PATENT DOCUMENTS

| | | | | |
|---|---|---|---|---|
| 3,700,307 A | * | 10/1972 | Glenn | 359/497 |
| 3,790,252 A | * | 2/1974 | Pao | 359/299 |
| 5,477,377 A | * | 12/1995 | Golding et al. | 359/326 |
| 5,547,705 A | * | 8/1996 | Fukuzawa et al. | 427/162 |
| 5,594,093 A | * | 1/1997 | Sotoyama et al. | 528/353 |
| 6,314,215 B1 | * | 11/2001 | Shay et al. | 385/16 |
| 6,806,996 B2 | * | 10/2004 | Tatsuura et al. | 359/298 |
| 2003/0035972 A1 | * | 2/2003 | Hanson et al. | 428/480 |
| 2003/0220511 A1 | * | 11/2003 | Tian et al. | 549/309 |
| 2004/0001666 A1 | * | 1/2004 | Tian et al. | 385/16 |

* cited by examiner

Primary Examiner—Frank G. Font
Assistant Examiner—Ryan Lepisto
(74) Attorney, Agent, or Firm—Oliff & Berridge, PLC

(57) ABSTRACT

An optical switching device including a substrate and at least an organic film as a light control part formed on the substrate. Optical switching is performed by applying signal light and control light to the organic film, the wavelengths of the signal light and the control light being set in a region in the vicinity of resonance on the longer wavelength side in the absorption spectrum of the organic film; and by changing a real part or real and imaginary parts of the refractive index of the light control part by using the control light, to thereby cause a phase difference in the signal light.

23 Claims, 10 Drawing Sheets

F I G . 1
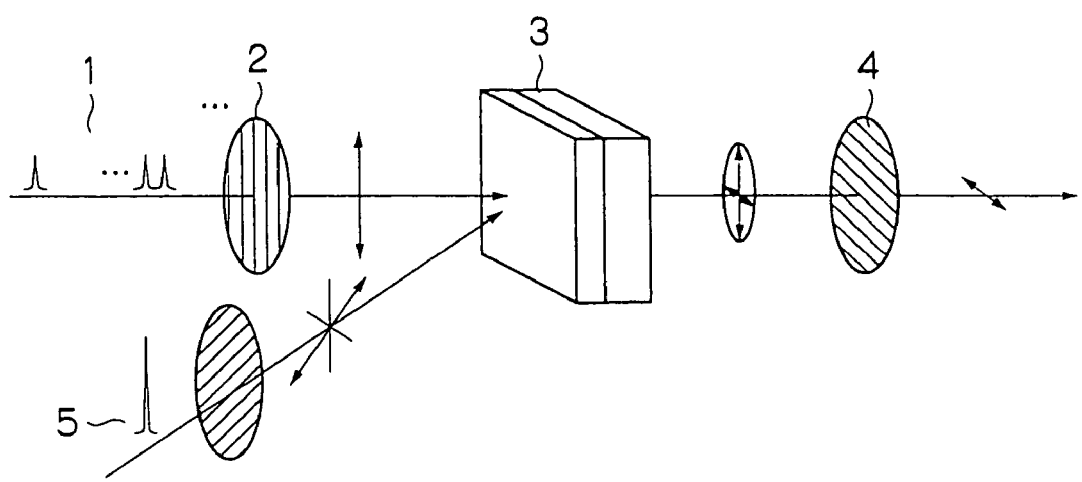

FIG. 4
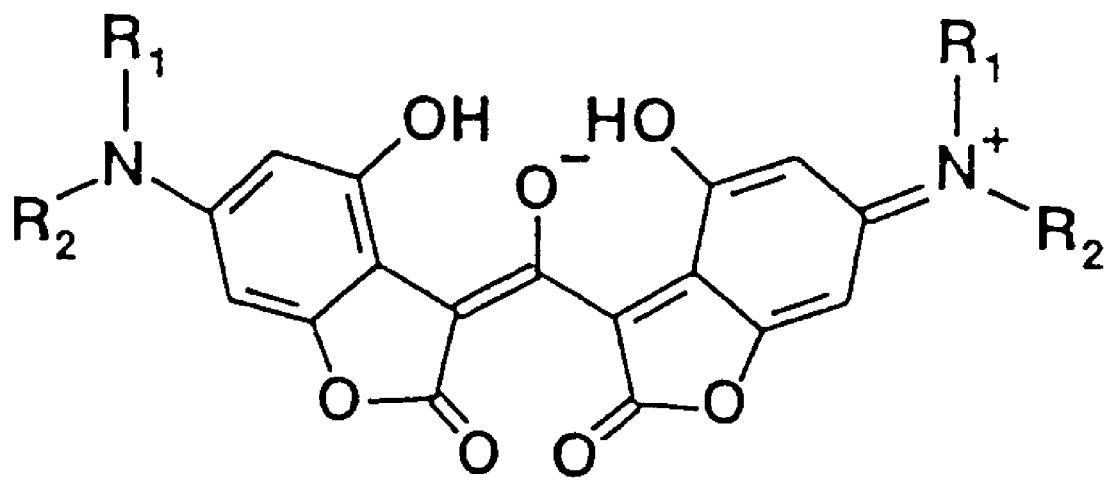

OPTICAL SWITCHING DEVICE AND OPTICAL DEVICE

CROSS-REFERENCE TO RELATED APPLICATION

This application claims priority under 35USC 119 from Japanese Patent Application No. 2003-332957, the disclosure of which is incorporated by reference herein.

BACKGROUND OF THE INVENTION

1. Field of the Invention

The present invention relates to an optical switching device which performs ultrahigh speed optical switching of signal light in a wavelength region for optical communication with control light by utilizing high nonlinear optical properties of organic film in a wavelength region for optical communication. It also relates to an optical device using this optical switching device.

2. Description of the Related Art

We studied an associated thin film of a squarelirium derivative which can be used in an optical switch for the optical communication of terabit ($10^{12}$ bit/s) order, and confirmed that the squarelirium dye derivatives form an association on a solid substrate and that the association exhibits super high speed optical response characteristics at femtosecond order (see Japanese Patent Application Laid-open (JP-A) No. 2000-111967).

SUMMARY OF THE INVENTION

For the purpose of providing inexpensive optical switching material with a large area which realizes ultrahigh speed optical switching in a wavelength region for optical communication, we developed a dibenzofuranonyl methanolate compound (the compound represented by formula (I) below) after the above described study. It has been found that the compound has absorption in the communication wavelength band around 1.3 μm; shows extremely large and ultrahigh speed nonlinear optical response in that wavelength region; and realizes an ultrahigh speed optical device in the communication wavelength band. (See U.S. patent application Ser. No. 10/404,655 (U.S. Patent Application Publication No. 2003/0220511) and U.S. patent application Ser. No. 10/422,740 (U.S. Patent Application Publication No. 2004/0001666). These U.S. Patent Applications were published after the Japanese patent application (Japanese Patent Application No. 2003-332957) from which the present application claims priority had been filed.)

The present inventors experimentally manufactured an optical switch with actual excitation of an electron by utilizing light absorption in the communication wavelength band of the dibenzofuranonyl methanolate compound and verified their high speed response properties.

The features of the optical switches using organic film made from a material such as the dibenzofuranonyl methanolate compound include:

(1) excellent productivity due to inexpensive material and low cost production process;

(2) production and operation of the optical switches can be carried out at room temperature and in the air;

(3) optical switches having diameters of several to several tens centimeters, which are extremely difficult to be realized with semiconductor material, can be easily formed; and (4) high performance with molecular modification and hybrid with different kinds of materials can be easily achieved.

However, the aforementioned optical switches have the following drawbacks:

(a) since the switches are absorption changing type (dye molecules are excited by control light so as not to absorb light, thereby allowing the transmission of signal light), it is difficult to make the off component zero, thereby failing to achieve a high on/off ratio;

(b) since the optical switching involves the actual excitation of an electron, response speed is restricted by electron relaxation time;

(c) optical switching efficiency decreases largely or even becomes impossible in a wavelength region where the organic film has reduced absorption;

(d) the optical switching uses a wavelength region having light absorption, and thus when the film is over a certain thickness, both the control light and the signal light attenuate, making it difficult to realize high nonlinearity and high throughput; and (e) loss of the control light and the signal light occurs due to surface reflection derived from the high refractive index of the organic film.

In particular, a film of the dibenzofuranonyl methanolate compound has no absorption at 1.55 μm, which is the most widely used wavelength among optical communication wavelength bands. Thus, it has been impossible for the optical switches having a structure disclosed aforementioned patent applications to perform optical switching with light having a wavelength of 1.55 μm due to the drawback described in (c) above.

However, the present inventors have accomplished to overcome the drawbacks (a) to (e) above, while keeping the features mentioned in (1) to (4) above which are extremely effective in our previous proposal. To be more specific, the present inventors have found that the optical switch of the present invention provides an optical switching device which has a high on/off ratio and high response speed in a widely used communication wavelength band and which can realize high nonlinearity and high throughput, and that it also provides an optical device utilizing the optical switching device at low cost and in a simple process.

In the invention, the real part or the real and imaginary parts of refractive index of a light control part is changed by control light and a phase difference occurs in signal light so as to perform optical switching. It is found that the performance of the optical switches using a conventional organic film can be improved greatly by setting the wavelengths of the signal light and control light in a wavelength region which hardly causes actual excitation of an electron in the organic film, or a wavelength region which has almost no absorption.

Since the wavelengths of the signal light and the control light are set in the nearly transparent region (the region in the vicinity of resonance) of the organic film formed in the light control part, the signal light is switched by mainly using a change in the refractive index of the real part of the light control part. In the optical path of the signal light, a pair of polarizers is arranged on the both sides of the organic film with their polarization directions thereof being orthogonal to each other (cross Nicol position) so as to minimize the quantity of transmitted light. The control light which is set at a polarization angle of 45 degrees with respect to the signal light is applied to the light control part simultaneously with the signal light. At this point, the control light causes refraction anisotropy in the organic film (multilayered film), whereby the signal light changes from linear polarization to elliptic polarization. As a result, a transmitted light component that is orthogonally crossed with the polarization direction of the signal light appears, and this light is observed as the optical switching output.

A first aspect of the present invention is to provide an optical switching device including a substrate and at least an organic film as a light control part formed on the substrate, wherein optical switching is performed by applying signal light and control light to the organic film, the wavelengths of the signal light and the control light being set in a region in the vicinity of resonance on the longer wavelength side in the absorption spectrum of the organic film, which is the light control part; and by changing a real part or real and imaginary parts of the refractive index of the light control part by using the control light, to thereby cause a phase difference in the signal light.

A second aspect of the present invention is to provide an optical device including the optical switching device of the first aspect is disposed in contact with at least one of an optical input part and an optical output part of an optical element, wherein the substrate is a flexible film.

A third aspect of the present invention is to provide an optical device including at least an organic film as a light control part formed at at least one of an optical input part and an optical output part of an optical element, wherein the optical switching is performed by applying signal light and control light to the organic film, the wavelengths of the signal light and the control light being set in a region in the vicinity of resonance on the longer wavelength side in the absorption spectrum of the organic film; and by changing a real part or real and imaginary parts of the refractive index of the light control part by the control light, to thereby cause a phase difference in the signal light.

With the aforementioned means, the invention can avoid the drawbacks of above-mentioned (a) to (e) and provide the following effects, respectively:

(A) since the optical switching output is observed as an on output based on the zero background, a decrease in the background due to the precise adjustment of the cross Nicol position can greatly increase the on/off ratio, as compared with the switches of the absorption changing type;

(B) the absence of actual excitation of an electron in the molecules realizes ultrahigh speed response;

(C) by not using actual excitation of an electron, the wavelengths of the signal light and the control light are not restricted by the absorption wavelength of the film and can be set to arbitrary wavelengths;

(D) since a wavelength for use has no absorption, the interaction length with light can be efficiently increased by increasing film thickness, thereby improving effective throughput and nonlinearity; and (E) the resonance effect derived from multilayered films enables the reflectance to decrease and/or the transmittance to increase at a specific wavelength. One or both of the signal light and control light can be adjusted to this wavelength so as to reduce light loss stemming from surface reflection.

The invention, which maintains the features of the optical switch described in (1) to (4) above, can provide an extremely high-performing ultrahigh speed optical switch free from the drawbacks of conventional optical switches. The invention is designed to improve the performance of the optical control device with organic film by setting the wavelengths of the control light and the signal light in the transparent region in the vicinity of resonance on the longer wavelength side of the absorption of the organic film, that is, the light control part. The organic film material is by no means limited to the dibenzofuranonyl methanolate compound.

According to the invention, it is possible to provide at an extremely low cost an ultrahigh speed optical switching device capable of operating in a wide wavelength region and an optical device utilizing the optical switching device. The invention also contributes to the formation of an ultrahigh speed switching system in which substrate materials that have been difficult to employ can now be used, and in which a novel structure can be achieved due to the provision of film material with a large area.

BRIEF DESCRIPTION OF THE DRAWINGS

FIG. 1 is a schematic view of a structure of the optical switching device of the present invention.

FIG. 4 is a view showing a molecular structure of the compound represented by formula (I) in the invention.

DETAILED DESCRIPTION OF THE INVENTION

Figure 2:
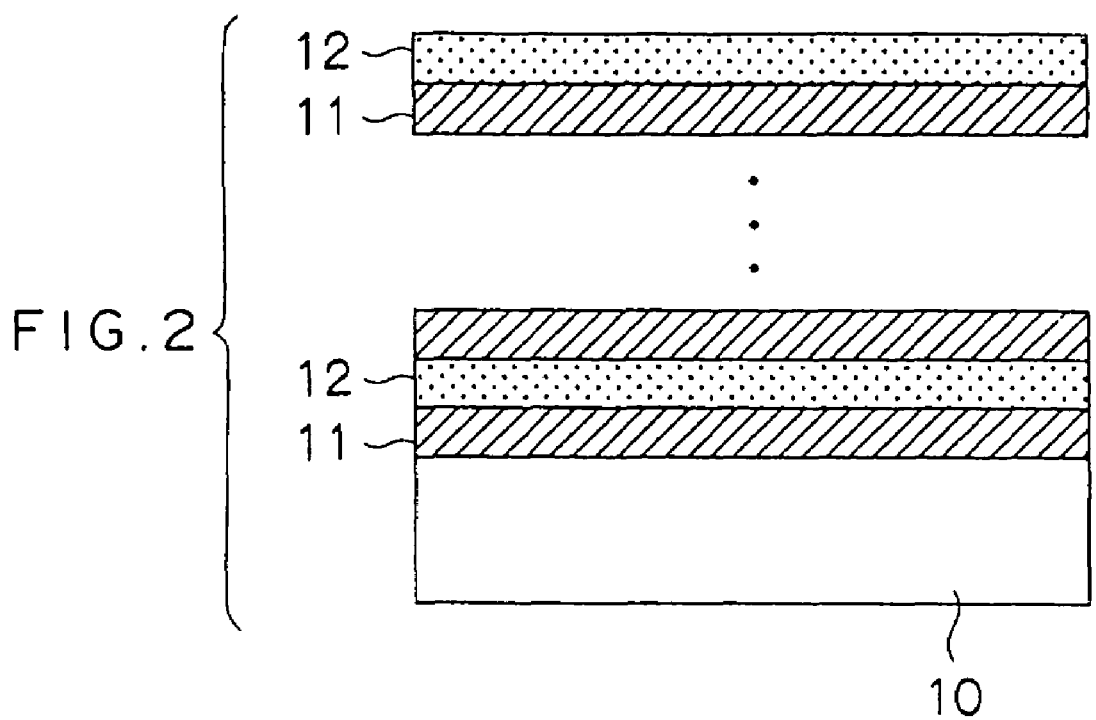
FIG. 2 is a cross sectional view of a structure of the light control part in the invention.

The invention will be described in detail as follows.

<Optical Switching Device>

The optical switching device of the invention comprises a substrate and at least an organic film as a light control part formed on a surface of the substrate. Optical switching of the optical switching device is performed by applying signal light and control light to the organic film. The wavelengths of the signal light and the control light are set in a transparent region in the vicinity of resonance on the longer wavelength side in the absorption spectrum of the organic film, which is the light control part. The optical switching is performed by changing real part or real and imaginary parts of the refractive index of the light control part by using the control light, to thereby cause a phase difference in the signal light.

The real part and the imaginary part of the refractive index mentioned above are the real part and the imaginary part of a so-called complex refractive index in an absorptive medium (compound). The real part of the refractive index changes based on the optical component that is not absorbed by the medium, whereas the imaginary part of the refractive index changes based on the optical component that is absorbed by the medium.

The change in the real part of the refractive index does not depend on the absorption of the medium and can follow the amplitude of the electric field of the control light, so the response speed is extremely high. On the other hand, the change in the imaginary part of the refractive index, which depends on the absorption of the medium, accompanies electron actual excitement of the molecules in the medium. As a result, the response speed is low, although the nonlinearity is high.

In the invention, by setting the wavelengths of the control light and the signal light in the region in the vicinity of resonance on the longer wavelength side of the absorption spectrum of the organic film or the light control part, the contributions of the change in the real and imaginary parts of the refractive index of the light control part due to the control light can be well balanced in terms of response speed and nonlinear response.

In the invention, the aforementioned "the region in the vicinity of resonance on the longer wavelength side of the absorption spectrum of the organic film" indicates a wavelength region in the vicinity of the edge on the longer wavelength side of the absorption spectrum (on the wavelength side longer than the maximum absorption) of the organic film, and more specifically, indicates a wavelength region where the absorbance is not more than 0.3 on the longer wavelength side.

When the signal light and the control light are applied to the organic film in the wavelength region mentioned above, it is difficult to completely eliminate the change in the imaginary part of the refractive index. Therefore, the aforementioned "the change in the real part of the refractive index" indicates the case where the imaginary part has almost no change and changes are substantially only in the real part.

The following is a description of, as one example of the invention, a highly efficient and ultrahigh speed optical switching device with the light having a communication wavelength band of 1.55 $\mu$m. In this example, the pulse width of a laser used for the signal light and the control light is several hundred femto seconds (fs=$10^{-15}$ seconds), and dibenzofuranonyl methanolate compound film and its multilayered film are used as the light control part.

FIG. 1 shows a schematic view of a structure of the optical switching device of the invention.

The device operates as follows when the wavelength in the transparent region (wavelength with an absorbance of 0.01 or so) having almost no absorption in the organic film of the light control part 3 (organic film) is selected as the wavelength of the signal light 1 and the control light 5 in FIG. 1. The signal light 1 (having the main wavelength of 1.55 $\mu$m) transmitted by an optical fiber or the like is converted into parallel light and applied to the light control part 3 in the state of being linearly polarized by the polarizer 2. The light control part 3 is composed of an organic film containing the compound represented by the following formula (I) or a multilayered film including the organic film and a dielectric film.

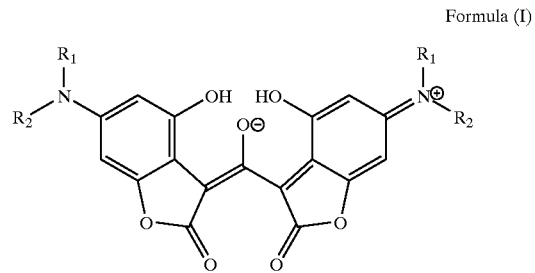

Formula (I)

In formula (I), $R_1$ and $R_2$ can be the same or different from each other, and each independently represent a straight-chain alkyl group or a branched alkyl group.

When the control light 5 is absent, the signal light 1 is blocked by the analyzer 4 arranged in cross Nicol position with respect to the polarizer 2, so no transmitted light component is observed (off state).

Next, the control light 5 which is linearly polarized light having an inclination of 45 degrees with respect to the signal light 1 is applied to the light control part 3 in synchronization with the signal light 1. In general, each of the signal light 1 and the control light 5 is condensed via a light-focusing means such as a lens and focused onto a point on the light control part 3. In this case, the signal light 1 and the control light 5 can be condensed by the same light-focusing means or ones different from each other.

Here, "in synchronization with the signal light 1" indicates that the pulses of the control light 5 are applied onto the light control part 3 in the same timing as at least part of the linearly polarized pulses to be controlled which are extracted from the signal light 1.

The light-focusing means focuses the signal light 1 and the control light 5 to a point with a diameter preferably in a range of 3 to 10 $\mu$m, and more preferably in a range of 4 to 6 $\mu$m. When the diameter of the focal point is less than 3 $\mu$m, the overlap between the control light 5 and the signal light 1 may be insufficient, and when the diameter is over 10 $\mu$m, the light intensity of the control light 5 required for switching may increase.

Because of the nonlinear optical effects induced by the control light 5, the light control part 3 has a difference in refractive index (refraction anisotropy) between the polarization direction of the control light 5 and the direction orthogonal to it. The refraction anisotropy makes the signal light 1 be converted into elliptic polarization of light when the signal light 1 passes through the light control part 3. In other words, in this case, the real part of the refractive index of the light control part 3 is changed by the control light 5, thereby causing a phase difference in the signal light 1.

The signal light 1 and the control light 5 are optical pulses. Since high light intensity is required to achieve high nonlinear performance, the optical pulses to be used preferably have a short time width in a range of $10^{-12}$ to $10^{-13}$ seconds.

Finally, the direction component of the elliptic polarization of light in agreement with the analyzer 4 is observed as output (on state). The optical switching device thus prepared has the features described in (A) to (E) above. To be more specific, they are a high on/off ratio, ultrahigh speed response, arbitrary setting of operating wavelength, high throughput and low driving energy.

Next, the case where the wavelength in the absorption region (wavelength with an absorbance of 1 or so) of the light control part 3 (organic film) is used as the wavelength of the signal light 1 and the control light 5 will be explained. Even in this case, optical switching can be performed in the same structure as FIG. 1. In this case, in addition to the refraction anisotropy, the effects of the absorption anisotropy are used. In other words, the control light 5 changes the real and imaginary parts of the refractive index of the light control part 3.

However, the control light 5 or the signal light 1 is partly absorbed to the organic film, and thus an increase in the film thickness of the light control part 3 may lead to a decrease in the throughput or to restriction of the improvement of nonlinear properties. Furthermore, since actual excitation of an electron is involved, the electron relaxation time may affect the response time, which may result in a decrease in switching speed.

In the present invention, as described above, it is possible to adopt a method in which the control light 5 changes not only the real part of the refractive index of the light control part 3, but both the real and imaginary parts thereof. However, in view of the above-described properties of the optical switching device, it is preferable to mainly use the change in the real part of the refractive index of the light control part 3, without actually exciting an electron in the compound contained in the organic film.

In the invention, in the case where the compound represented by formula (I) is used as the organic film, in order to realize an optical switching device utilizing the change in the real part of the refractive index of the light control part 3 as mentioned above, the center wavelengths of the signal light 1 and the control light 5 are preferably set to 1480 nm or more, and more preferably 1520 nm or more. The compound represented by formula (I) has virtually no absorption at the wavelength of 1480 nm or more, enabling to use the change substantially only in the real part of the refractive index.

The ratio of contribution between the change in the real part and the change in the imaginary part of the refractive index of the light control part 3 can be estimated by measuring the real part and the imaginary part of the nonlinear refractive index of the light control part 3 independently of each other by Z-scan technique or the like; the ratio of the change in the real part to the entire change in the refractive index (the change in the real part/the entire change) is preferably in a range of 60 to 100%, and more preferably in a range of 90 to 100%.

(Light Control Part)

The following is a description of the structure of the light control part 3.

Substrate

The substrate can be made from glass, quartz, sapphire, silicon, plastic, or other materials. Using a film-like base member having flexibility (a flexible film) as the substrate can produce a flexible optical switching device, which will be described below. In the case of a reflection type device, it is possible to use a metal substrate made of gold, silver, aluminum, etc., or a reflective substrate that is made by vacuum deposition of these metals on the above-described substrate.

Organic Film

The organic film used for the light control part 3 is not particularly limited. However, the organic film preferably includes the compound (dibenzofuranonyl methanolate compound) represented by the following formula (I), from the viewpoint that the maximum absorption is around 1.3 μm; that the absorption edge on the longer wavelength side is 1400 nm or more; and that large nonlinear optical properties can be obtained even if the absorption is small.

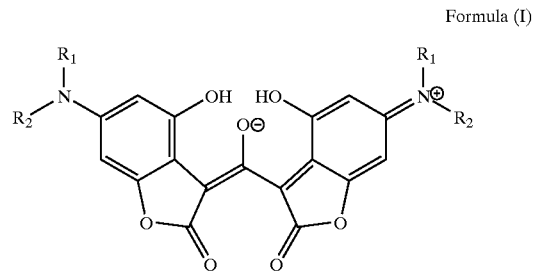

Formula (I)

In formula (I), $R_1$ and $R_2$ can be the same or different from each other and each independently represent a straight-chain alkyl group or a branched alkyl group. $R_1$ and $R_2$ are preferably a straight-chain alkyl group having 1 to 7 carbon atoms or a branched alkyl group having 3 to 7 carbon atoms. More specifically, $R_1$ and $R_2$ are preferably a methyl group, an ethyl group, an n-propyl group, an n-butyl group, an isopropyl group, an isobutyl group, a sec-butyl group, or a tert-butyl group, and particularly preferably an n-propyl group, an n-butyl group, an isopropyl group, an isobutyl group, or a sec-butyl group.

This compound has maximum absorption around 1.1 μm, and can greatly enlarge its absorption wavelength without excessively extending the conjugated system, unlike the conventional longer wavelength absorption dyes. The compound also has high thermal stability, excellent solubility in organic solvent such as acetone or chloroform, film-forming properties, and also excellent sublimability.

The compound represented by formula (I) used in the invention can have the structure represented by the following structural formula. The compound expressed in this structural formula has the same properties mentioned above as the compound having the structural formula represented by formula (I).

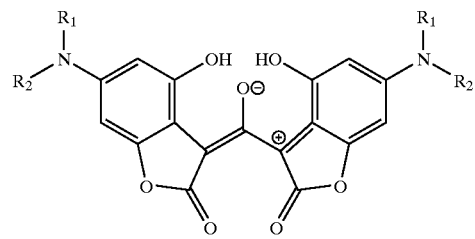

The compound represented by formula (I) can be produced by a production method including the process for reacting the aniline derivative represented by the following formula (II) with 4,5-dihydroxy-4-cyclopentene-1,2,3-trione represented by the following formula (III).

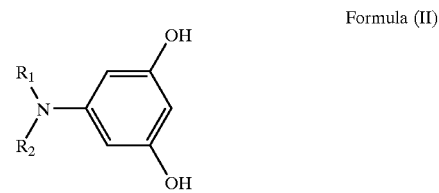

Formula (II)

Formula (III)

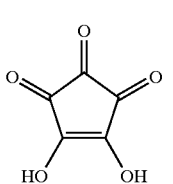

In formula (II), $R_1$ and $R_2$ can be the same or different from each other, and each independently represent a straight-chain alkyl group or a branched alkyl group.

Examples of the novel dye compounds used in the invention will be shown as follows.

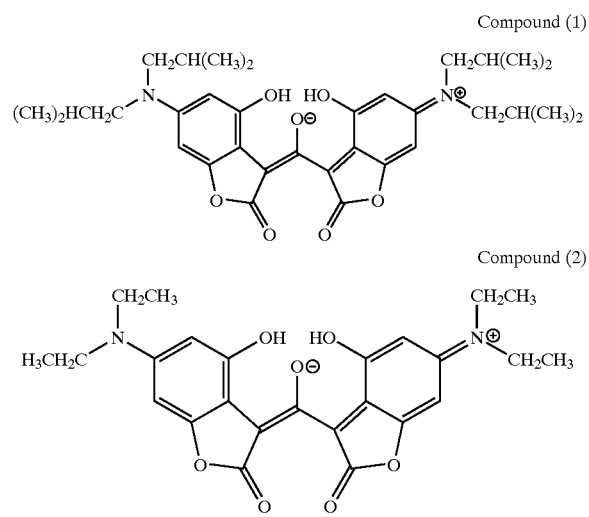

Compound (1)

Compound (2)

The organic film of the invention can be easily formed by applying the organic solvent solution of the compound represented by formula (I) onto the substrate.

The solvent into which to dissolve the compound is not particularly restricted and can be hydrocarbon halide such as dichloromethane, chloroform, dichloroethane, trichloroethane, or dichloropropane; aromatic hydrocarbon such as benzene, toluene, xylene, or monochlorobenzene; alcohol such as methanol, ethanol, or 2-propanol; ketone such as cychlohexanone or methylethylketone; ether such as tetrahydrofuran or dioxane; ester such as methyl acetate or ethyl acetate; amide such as N,N-dimethyl formamide or N,N-dimethyl acetamide; or amine such as propyl amine or diethyl amine. Of these, hydrocarbon halide and alcohol, to be more specific, chloroform, dichloroethane, dichloropropane, monochlorobenzene, and 2-propanole are preferable and dichloroethane and dichloropropane are particularly preferable.

The concentration of the compound in the solution is preferably in a range of 0.1 to 5% by mass, and more preferably in a range of 0.3 to 4% by mass. Setting the concentration in this range enables the formation of an association of good quality.

The obtained solution can be coated onto the substrate by conventionally well-known methods such as bar coating, spin coating, cast coating, and dip coating; in the invention, spin coating is preferable in the viewpoint of forming a film with uniform thickness.

The thickness of the organic film is preferably in a range of 50 nm to 900 nm, although it depends on the application.

Multilayered Film

The multilayered film in the invention will be explained as follows.

For the improvement of the effective nonlinear performance of the material, it is effective to increase an interaction length between the material and light. In the case of a film, a film thickness can be increased. However, in the case of a film material including an organic compound, there is a general tendency for film quality to decrease with an increase in film thickness, and the organic film containing the compound (dibenzofuranonyl methanolate compound) represented by formula (I) is not an exception. The reason for this seems to be that an increase in the film thickness causes a drying process to become uneven during the film formation in the wet process.

The inventors of the invention have found that the effective film thickness can be increased without decreasing the film quality of the organic film by stacking the organic film together with the dielectric film in a laminated structure (a multilayered film).

FIG. 2 shows a cross sectional view of the multilayered film formed on the substrate surface. The method for forming the multilayered film is as follows. First, the organic film 11 is formed on the surface of the substrate 10 made of glass, etc. Next, the dielectric film 12 is formed thereon by dry or wet process. In the case of the wet process, it is necessary to select a solvent which will not damage the organic film 11. Another organic film 11 is formed further thereon, and the formation of the organic films 11 by this method is repeated N times to increase the effective film thickness of the organic films 11.

In this case, each of the organic films 11 preferably has a thickness not causing a decrease in the film quality, or 50 to 300 nm or so. On the other hand, each of the dielectric films 12 preferably has a thickness which can prevent the underlying layer from being eroded and damaged by the solvent when the organic films 11 are formed thereon by wet process, or 600 to 1200 nm or so. The uppermost layer can be the dielectric film 12 to prevent the underlying organic film 11 from coming into contact with the atmospheric air, thereby reducing performance deterioration.

In order to efficiently obtain the aforementioned optical switching properties of the invention, the organic film preferably contains the compound represented by formula (I), and the number of the organic films 11 to be stacked in the multilayered film is preferably 3 or more.

In the case of forming a multilayered film comprising the organic film and the dielectric film, there are two conceivable methods: one which does not use an interference effect and one which actively uses an interference effect. In the case of not using the interference effect, the dielectric film 12 is preferably made of a material having a small difference in refractive index from the organic film 11. In this case, since the reflection between the organic film and the dielectric film is small, the optical influence of the dielectric film 12 can be minimized. As a result, the multilayered film has properties similar to those achieved by stacking only the organic films 11. One advantage of this method is that it is possible to select the signal light and the control light in a wide wavelength range since the absorption spectrum does not exhibit a specific structure.

In order to obtain these effects, the difference between a refractive index of the dielectric film 12 and a refractive index of the organic film 11 is preferably in a range of 0 to 0.5, and more preferably in a range of 0 to 0.3.

On the other hand, in the case of actively making use of the interference effect, the dielectric film 12 is preferably made of a material having a large difference in refractive index from the organic film 11. In this case, because a large amount of reflection occurs between the organic film and the dielectric film, a standing wave is formed within the multilayered film due to Bragg reflection. This standing wave optically brings about a periodic structure in the transmission and reflection spectrums in the transparent wavelength region of the material. The reflectance decreases and the transmittance increases at specific wavelengths. Therefore, the signal light and/or the control light can be adjusted to these wavelengths to suppress the reflecting components of the signal and control lights, thereby using the energy efficiently.

In this manner, the resonance effect deriving from the multilayered film of the invention can reduce the reflectance at specific wavelengths, thereby reducing the light loss due to the surface reflection of the signal light and/or the control light.

In order to effectively achieve the aforementioned effects, the difference between a refractive index of the dielectric film 12 and that of the organic film 11 is preferably in a range of 0.5 to 1.8, and more preferably in a range of 0.8 to 1.2.

In this case, the presence of absorption in the multilayered film lowers the aforementioned effects. Since the wavelengths which decrease the reflectance and increase the transmittance are determined by the film thickness and the refractive index of each of the organic films and dielectric films, it is necessary to precisely control them in accordance with the wavelengths used. Furthermore, the periodic structure in the spectrum has a shorter period with increasing number of films stacked, whereby more strict constraints are imposed on the wavelength width and wavelength deviation of the signal light and the control light.

As described above, the case with interference effect and the case without interference effect have features of their own, so it is important to perform optimum material selection and structure design in accordance with the purpose of use. It goes without saying that this method can be easily used for other organic thin materials in order to improve their performance in the organic film, which is the light control part, and that the materials contained in the organic film are not limited to the compound represented by formula (I).

The dielectric film 12 can be an organic dielectric film or an inorganic dielectric film whose refractive index has a difference from a refractive index of the aforementioned organic film 11 in a preferable range.

The inorganic dielectric film has no particular restrictions, but is preferably made from at least one kind selected from GeO film, $MgF_2$ film, $CaF_2$ film, and SiO film. The refractive index of the organic film containing the compound represented by formula (I) is 2.47 or so. Examples of a material whose refractive index has a small difference from the refractive index of the organic film include GeO film (refractive index: 2.21), and examples of a material whose refractive index has a large difference from the refractive index of the organic film include $CaF_2$ film (refractive index: 1.22), $MgF_2$ film (refractive index: 1.32), and SiO film (refractive index: 1.52).

These inorganic dielectric films are preferably produced in dry process from the viewpoint of film forming properties and control easiness of film thickness, and more preferably produced by vacuum deposition.

The organic dielectric film can be made from water soluble polymer such as polyvinyl alcohol (refractive index: 1.51) or organic polymer material such as polymethyl methacrylate, polyvinyl carbazole, polycarbonate, or polyvinyl chloride, and the dielectric film 12 can be made from material appropriately selected from the viewpoint of film forming properties and the aforementioned preferable refractive index.

In the case of using the organic polymer material, it is possible to select a solvent not damaging the organic film 11 containing the compound represented by formula (I). Therefore, it is preferable to form an organic dielectric film by wet process such as spin coating using a solution dissolved in such a solvent.

As the dielectric film 12, either the inorganic dielectric film or the organic dielectric film can be selected as necessary, and also these films can be used in combination.

(Spatial Optical Distribution System)

According to the invention, a spatial optical distribution system with a single control light can be established by dividing the organic film containing the compound represented by formula (I) or the multilayered film comprising the organic film and the dielectric film into independent plural sections, and performing optical control in these sections in parallel. In this system, the organic film is utilized as the ultrahigh speed optical switch material that the inventors of the invention proposed earlier (JP-A No. 11-15031).

Figure 3:
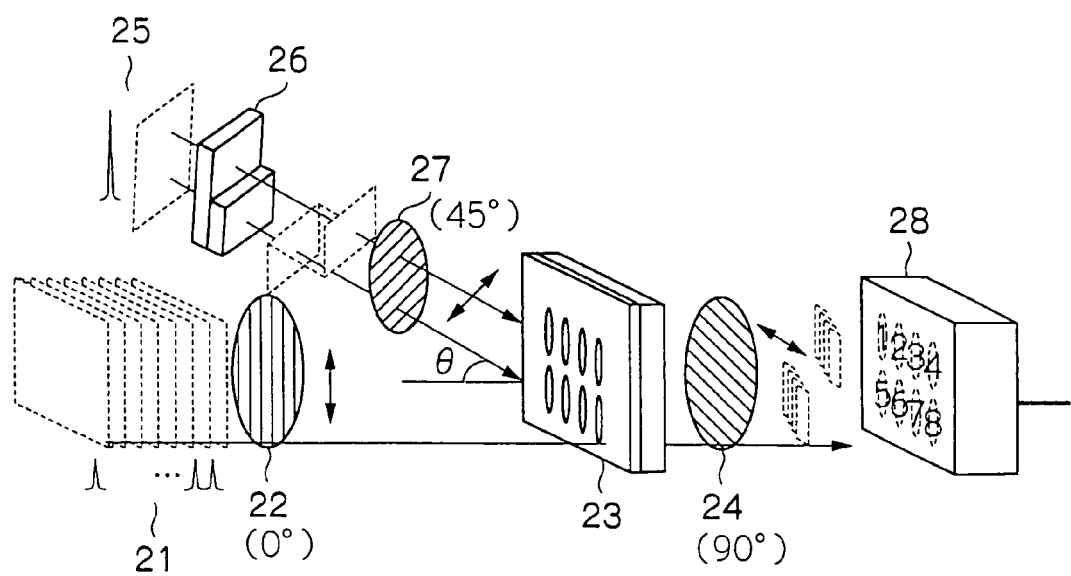
FIG. 3 is a schematic view showing the mechanism of the spatial optical distribution system, which operates divided plural sections of the light control part in parallel.

The structure and operating mechanism of the spatial optical distribution system are shown in FIG. 3. The signal light 21 and the control light 25, both of which are optical pulses, are spatially expanded to form sheet-like lights. These lights are made incident to the light control part 23 made from the aforementioned organic film; the control light 25 is made diagonally incident with partial time delay so that the control light 25 can reach each position of the light control part 23 at a different point in time. In this case, the time required for the control light 25 to reach each position of the light control part 23 can be made to coincide with the time required for each pulse of the signal light 21 to reach the light control part 23 so as to convert the signal light 23, serving as a serial signal, into plural parallel outputs by using a single control light. In the drawing, reference numerals 22, 24, and 27 represent polarizers; reference numeral 26 represents an optical delay element; and reference numeral 28 represents a signal detection part.

Thus, using the aforementioned organic film enables the spatial optical distribution system to operate in communication wavelength band.

<Optical Device>

Another feature of the invention is that various materials can be selected for the substrate because the organic film materials are not crystalline and do not require high temperature during the film formation. Optical switching devices with semiconductor quantum well structure generally require a crystalline substrate such as InGaAs or InP substrate for crystal growth, and the growth temperature is required to be 500° C. or higher, or in the case of special materials characterized in low-temperature growth, 200° C. or higher growth temperature is required.

The materials used for the organic film, which is the light control part in the invention, are characterized in being amorphous, and can be formed onto the surface of a glass plate, a metal plate, or a polymer film at room temperature. This feature enables the formation of the organic film, which is the light control part, on the optical input part and/or optical output part of an optical element such as a lens, a prism and the like, whereby a new optical device with the optical element equipped with optical switching function can be obtained.

Furthermore, the organic film as the light control part can be formed on the surface of the aforementioned film-like base member (a flexible film) as the substrate to produce an optical film (optical switching device) equipped with the optical switching function. This optical film can be used solely as a flexible optical switch, or can be cut into a desired shape so as to come into contact (pasted to or bonded) with the optical input part and/or optical output part of any optical element, thereby obtaining an optical device capable of improving the performance of the optical element or the addition of a new function. Thus, the organic film material, which is the light control part in the invention, can be applied to a wider range of use than the conventional optical switching materials with the semiconductor quantum well structure.

The embodiments of the invention will be described as follows.

A first embodiment of the invention provides an optical switching device comprising a substrate and at least an organic film as a light control part formed on the substrate, wherein optical switching is performed by applying signal light and control light to the organic film, the wavelengths of the signal light and the control light being set in a region in the vicinity of resonance on the longer wavelength side in the absorption spectrum of the organic film; and by changing a real part or real and imaginary parts of the refractive index of the light control part by using the control light, to thereby cause a phase difference in the signal light.

A second embodiment of the invention provides the optical switching device of the first embodiment, wherein the organic film comprises a compound represented by the following formula (I):

Formula (I)

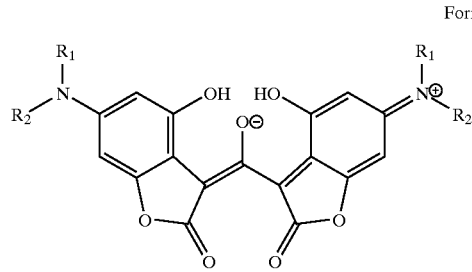

wherein $R_1$ and $R_2$ each independently represent a straight-chain alkyl group or a branched alkyl group.

A third embodiment of the invention provides the optical switching device of the second embodiment, wherein the optical switching is performed by setting the wavelengths of the signal light and the control light in a wavelength region which does not actually excite an electron in the compound represented by formula (I) contained in the organic film.

A fourth embodiment of the invention provides the optical switching device of the second embodiment, wherein center wavelengths of the signal light and the control light are set to 1480 nm or more.

A fifth embodiment of the invention provides the optical switching device of the first embodiment, wherein the optical switching is performed by arranging a pair of polarizers, whose polarization directions are orthogonal to each other, on both sides of the organic film in the optical path of the signal light, when the refractive index of the light control part is changed by the control light, thereby causing a phase difference in the signal light.

A sixth embodiment of the invention provides the optical switching device of the first embodiment, wherein the signal light and the control light are optical pulses having a time width in a range of $10^{-12}$ to $10^{-13}$ seconds.

A seventh embodiment of the invention provides the optical switching device of the first embodiment, wherein the light control part is a multilayered film comprising the organic film and a dielectric film.

An eighth embodiment of the invention provides the optical switching device of the seventh embodiment, wherein a difference between a refractive index of the dielectric film and a refractive index of the organic film is within a range of 0 to 0.5.

A ninth embodiment of the invention provides the optical switching device of the seventh embodiment, wherein a difference between a refractive index of the dielectric film and a refractive index of the organic film is within a range of 0.5 to 1.8.

A tenth embodiment of the invention provides the optical switching device of the seventh embodiment, wherein the organic film includes a compound represented by the following formula (I), and the dielectric film is at least one of an organic dielectric film and an inorganic dielectric film:

Formula (I)

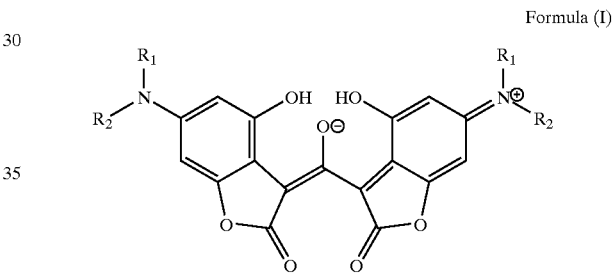

wherein $R_1$ and $R_2$ each independently represent a straight-chain alkyl group or a branched alkyl group.

An eleventh embodiment of the invention provides the optical switching device of the tenth embodiment, wherein the dielectric film includes at least one inorganic dielectric film selected from a GeO film, a $MgF_2$ film, a $CaF_2$ film, and a SiO film.

A twelfth embodiment of the invention provides the optical switching device of the ninth embodiment, wherein a center wavelength of the signal light and/or the control light is set in the vicinity of a wavelength region where reflectance is minimized and/or transmittance is maximized due to an interference effect deriving from the multilayered film.

A thirteenth embodiment of the invention provides the optical switching device of the seventh embodiment, wherein the dielectric film is an inorganic dielectric film formed by vacuum deposition.

A fourteenth embodiment of the invention provides the optical switching device of the seventh embodiment, wherein the dielectric film is an organic dielectric film formed by spin coating of a solution containing an organic solvent and organic polymer material dissolved therein.

A fifteenth embodiment of the invention provides the optical switching device of the second embodiment, wherein the organic film is formed by spin coating of a solution containing an organic solvent and the compound represented by the formula (I) dissolved therein.

A sixteenth embodiment of the invention provides the optical switching device of the tenth embodiment, wherein the organic film is formed by spin coating of a solution containing an organic solvent and the compound represented by the formula (I) dissolved therein.

A seventeenth embodiment of the invention provides the optical switching device of the first embodiment, wherein the signal light and the control light are condensed to the light control part by a light-focusing means.

An eighteenth embodiment of the invention provides the optical switching device of the seventeenth embodiment, wherein a diameter of a focal point is in a range of 3 to 10 µm when the signal light and the control light are condensed to the light control part.

A nineteenth embodiment of the invention provides the optical switching device of the first embodiment, wherein the light control part is divided into independent plural sections where light control is performed in parallel.

A twentieth embodiment of the invention provides the optical switching device of the first embodiment, wherein the substrate is a flexible film.

A twenty first embodiment of the invention provides an optical device including the optical switching device of twentieth embodiment which is disposed in contact with at least one of an optical input part and an optical output part of an optical element.

A twenty second embodiment of the invention provides an optical device including at least an organic film as a light control part formed at at least one of an optical input part and an optical output part of an optical element, wherein optical switching is performed by applying signal light and control light to the organic film, the wavelengths of the signal light and the control light being set in a region in the vicinity of resonance on the longer wavelength side in the absorption spectrum of the organic film; and by changing a real part or real and imaginary parts of the refractive index of the light control part by using the control light, to thereby cause a phase difference in the signal light.

EXAMPLES

The present invention will be described in detail in the following examples.

First, the compound represented by formula (I) used in the following examples will be described as follows. FIG. 4 shows the chemical formula of the dibenzofuranonyl methanolate compound (hereinafter abbreviated as BM4i4i) used for the production of each optical switching device. The synthesis of the BM4i4i, which is detailed in M. Tian et al., J. Am. Chem. Soc., 125(2003), pp. 348–9, is carried out as follows.

First, 3.325 g (14.0 mmol) of 3,5-dihydroxy-N,N-diisobutyl aniline and 995 mg (7.0 mmpl) of 4,5-dihydroxy-4-cyclopentene-1,2,3-trione are added to a mixture solution of 45 ml of 1-butanol and 135 ml of toluene, stirred in nitrogen gas atmosphere until the reaction solution is heated to 95° C., and reacted for 15 minutes at 95 to 105° C. The water generated from the reaction is removed by zeotropic distillation. After the reaction is over, toluene and 1-butanol are removed by distillation under reduced pressure, and then 150 ml of hexane is added. After cooling, the precipitated solid is filtered, and cleaned with hexane to obtain a brown-purple solid.

From this solid, purple fractions are removed by high-performance column chromatography (filler: neutral silica gel; eluent: dichloroethane or a mixture solvent of dichloroethane and methanol (in a volume ratio 100:1) to obtain a black-purple solid. After being purified through the recrystallization from a mixture solution of methanol, acetone and hexane, and then from another mixture solution of acetone and methanol, this black-purple solid is dried to obtain 301 mg of compound (black-purple acicular micro crystallite) having the structural formula shown in FIG. 4.

(Production of Optical Switching Device)

Figure 5:
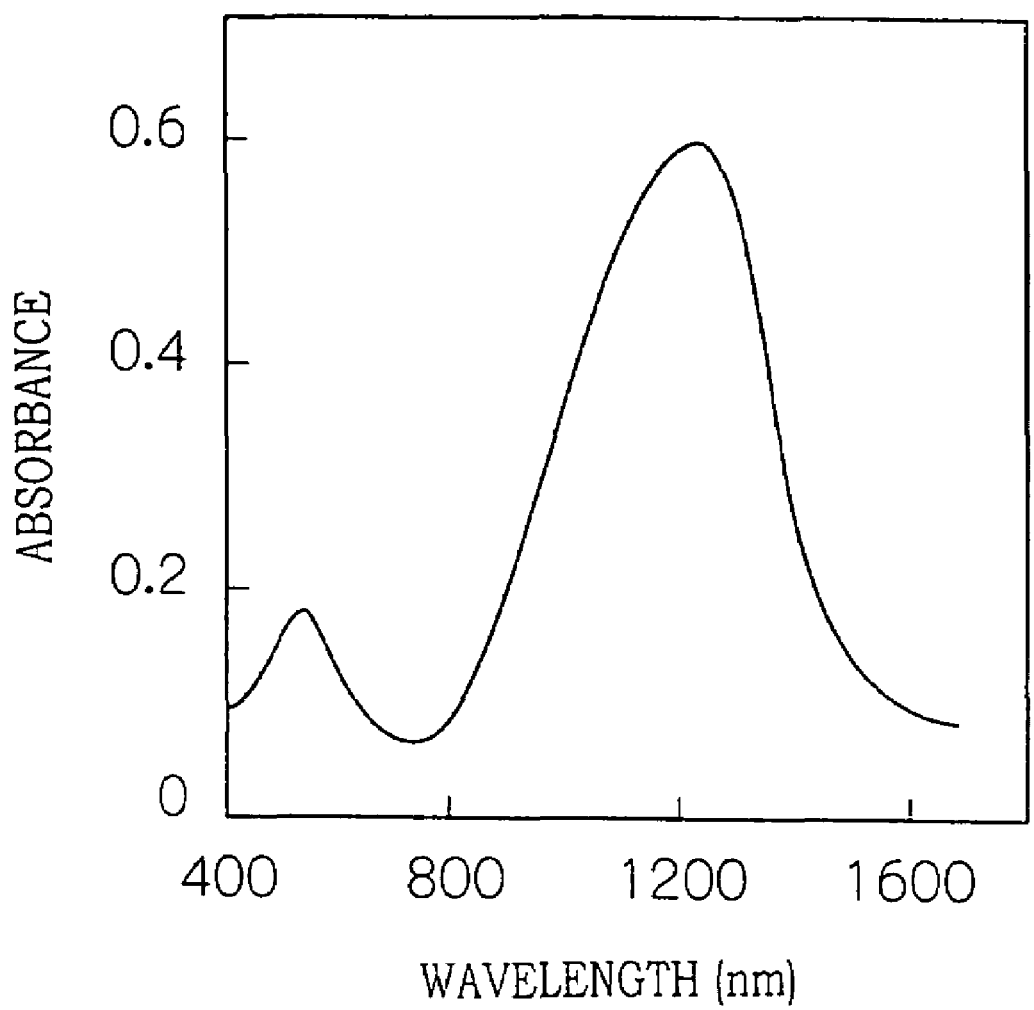
FIG. 5 is a graph showing an example of the absorption spectrum of the organic film in the invention.

The aforementioned BM4i4i is dissolved in tetrahydrofuran (the solvent can be an organic solvent such as 1,2-dichloroethane) at a concentration of 1 to 4% by mass. After being subjected to supersonic process for 5 to 10 minutes, the solution is filtered through a filter of 0.2 to 0.5 µm. This solution is dropped on the surface of the glass substrate (50 mm×50 mm) and spin-coated at 500 to 1000 rpm to form a film with a thickness of 210 nm (first layer). The absorption spectrum of the obtained organic film is shown in FIG. 5. The refractive index of this BM4i4i film is measured by Spectroscopic Ellipsometer (manufactured by J. A. WOOLLAM) to find it to be 2.43. The film thickness in this case is 63 nm.

Next, GeO film (refractive index: 2.21) is selected as the dielectric film to form a BM4i4i-and-GeO multilayered film, whereby an optical switching device is produced. The GeO film is formed to have a thickness of 1100 nm at a film forming rate of 0.3 to 0.5 nm/sec by vacuum deposition. On the GeO film surface is formed an organic film made from the BM4i4i as a second layer by the same spin coating as for the first layer. After the formation of the second layer, no damage is seen in the BM4i4i film of the first layer.

As described above, the BM4i4i films are formed up to the third layer alternately with the GeO films, so as to produce a multilayered film comprising a BM4i4i film, a GeO film, a BM4i4i film, a GeO film, a BM4i4i film, and a GeO film (the uppermost GeO film is a protection layer), stacked on a glass substrate in this order.

(Evaluation)

Figure 6:
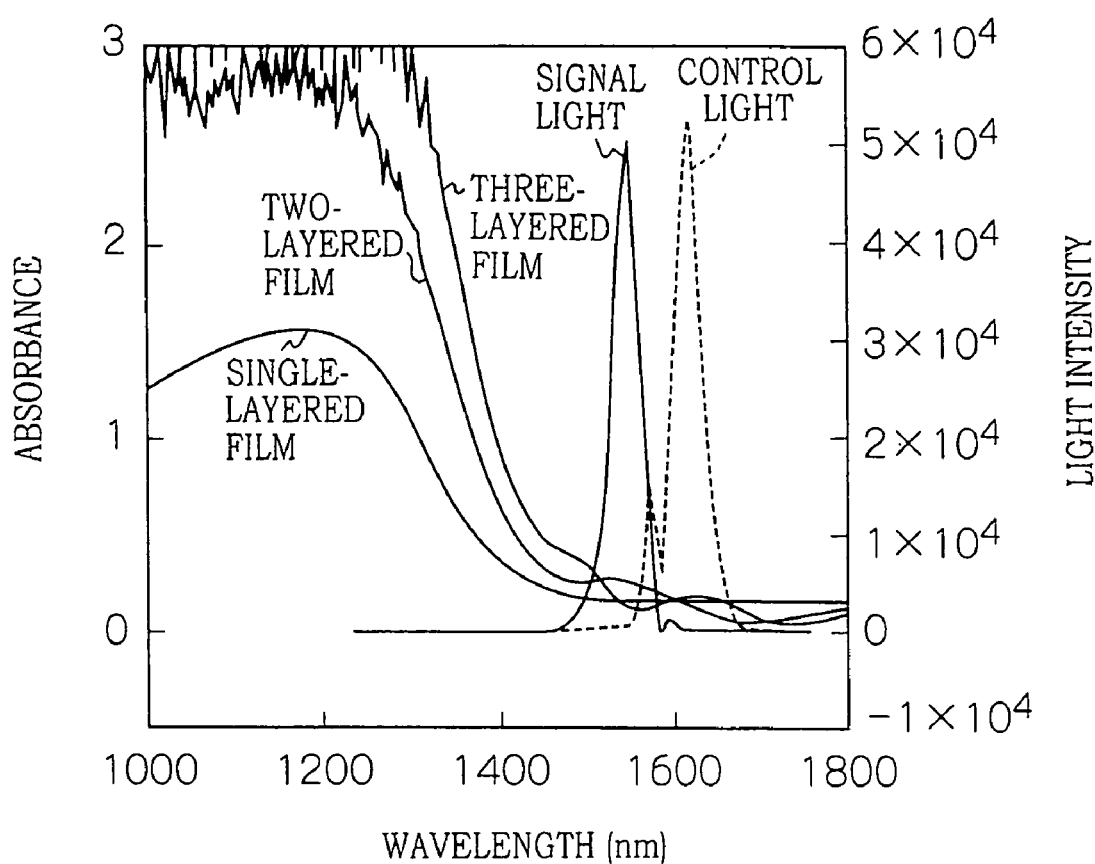
FIG. 6 is a graph showing the relationship between the absorption spectrum of multilayered films and the control and signal light spectrums.

FIG. 6 shows each absorption spectrum when BM4i4i films for the first, second, and third layers in the multilayered film are formed, together with the spectrums of the signal light and the control light.

As the control light and the signal light, a titanium/sapphire laser pulse is reproduced and amplified, and the wavelength thereof is converted into communication wavelength band (the wavelength of the signal light: 1550 nm, and the wavelength of the control light: 1630 nm) by using Optical parametric amplifier. The pulse width of this light is about 100 fs (fs=$10^{-15}$ seconds).

While using the multilayered film containing BM4i4i films stacked up to the third layer on a glass substrate as the light control part, the optical pulses of the signal light 1 and the control light 5 are condensed to the light control part 3 by a lens (light-focusing means), and the signal light 1 is switched according to the structure of the optical switching system shown in FIG. 1. The diameter of the focal point at this moment is about 1.7 mm.

Figure 7:
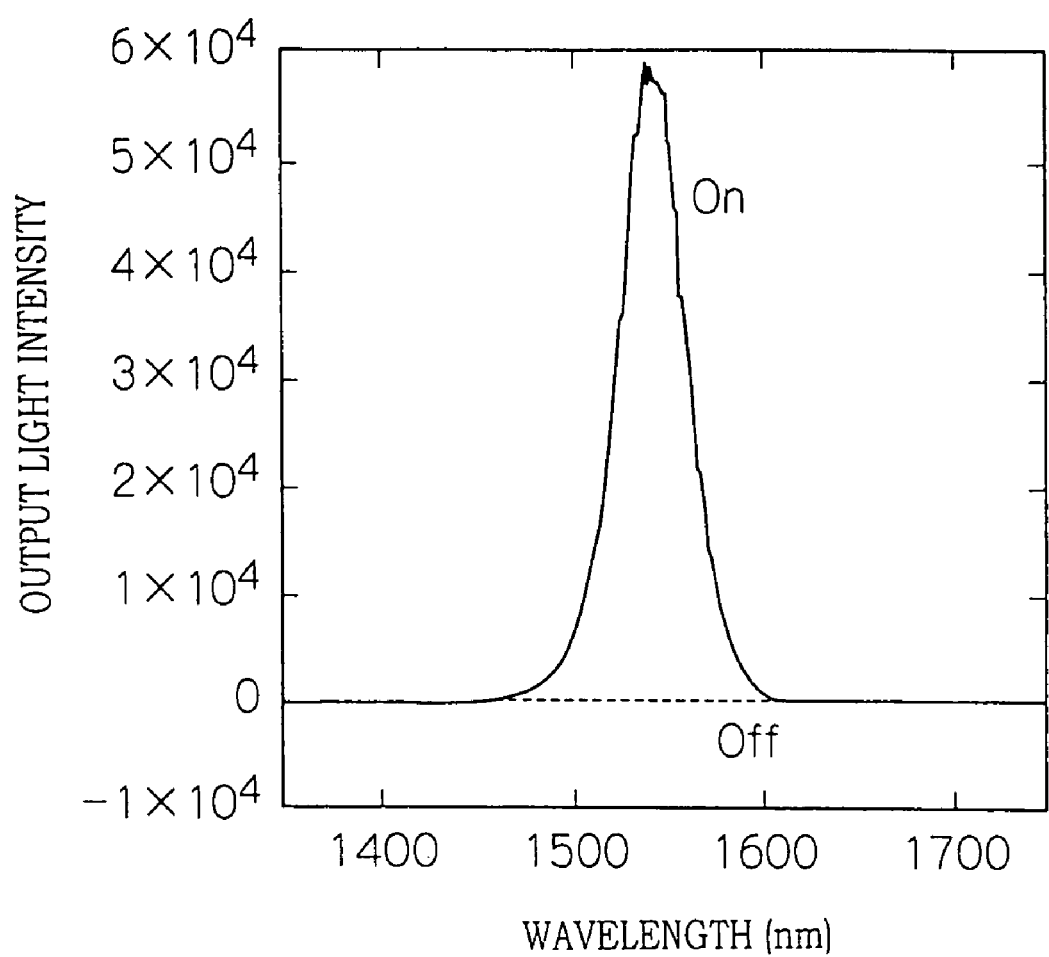
FIG. 7 is a graph showing an example of the output of the optical switching device of the invention.

The optical output results of the optical switching system are shown in FIG. 7. As shown in FIG. 7, when the control light intensity is 60 pJ/$\mu m^2$, the on/off ratio is about 300 (25 dB). The extreme smallness of the diffusion component of the control light 5 indicates the high optical quality of the multilayered film.

Figure 8:
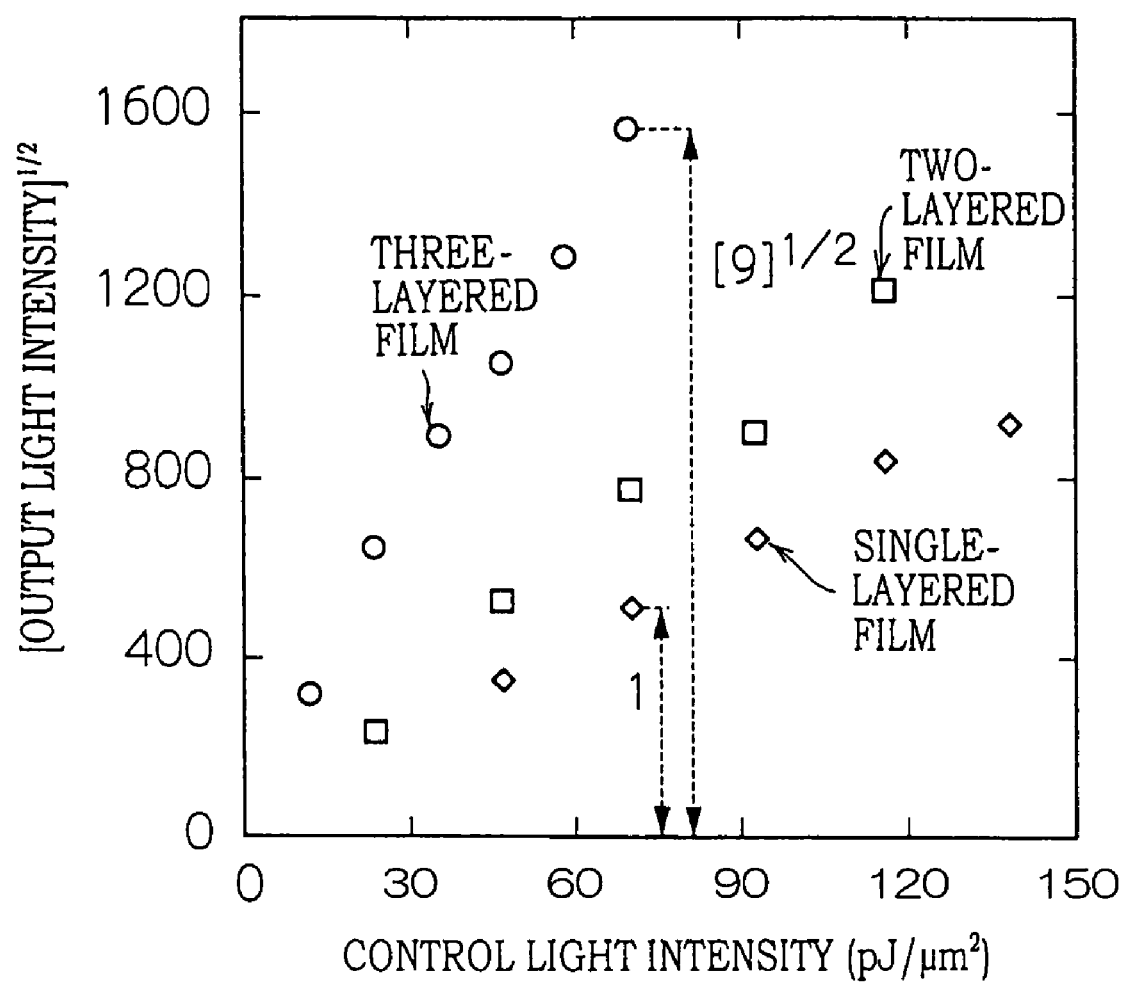
FIG. 8 is a graph showing the relationship between the control light intensity and the square root of the output light intensity in the optical switching device of the invention.

FIG. 8 shows the plot of the square root of the output light intensity with respect to the control light intensity. The square root of the output light intensity being almost proportional to the control light intensity indicates that the output shown in FIG. 7 derives from Kerr response. Furthermore, the device with the BM4i4i films up to the third layer has about 9 times as much output as the device with the BM4i4i film on the first layer only. This indicates that the expected increase in the nonlinear effects is obtained from an increase in film thickness. From this, it turns out that increasing the number of layers to be stacked can further improve the device performance.

The response speed of the optical switching device is examined by changing the timing of applying the control light slightly from the signal light.

Figure 9:
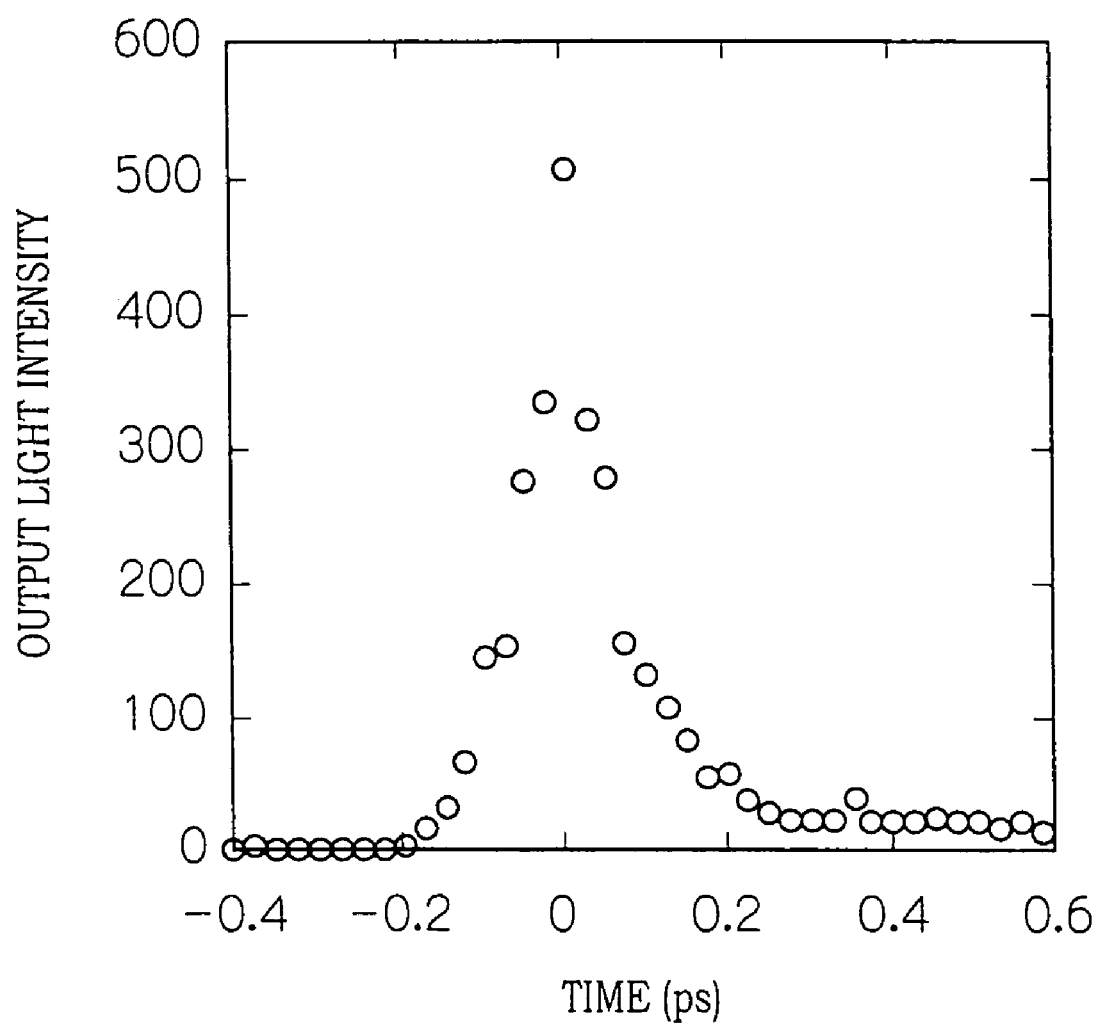
FIG. 9 is a graph showing the time response properties of the optical switching device of the invention.

FIG. 9 shows the result of time response properties of the optical output. Each plot in FIG. 9 is verified with exponential function to find that the light intensity is about 200 fs with 90% or more recovery, and that the response is at ultrahigh speed. It is also found that in this optical switching device, there is no late response component because of the absence of actual excitation. These results indicate that this device can switch the signal light having a repeating speed of 1 THz ($T=10^{12}$) or more at a high on/off ratio.

Figure 10:
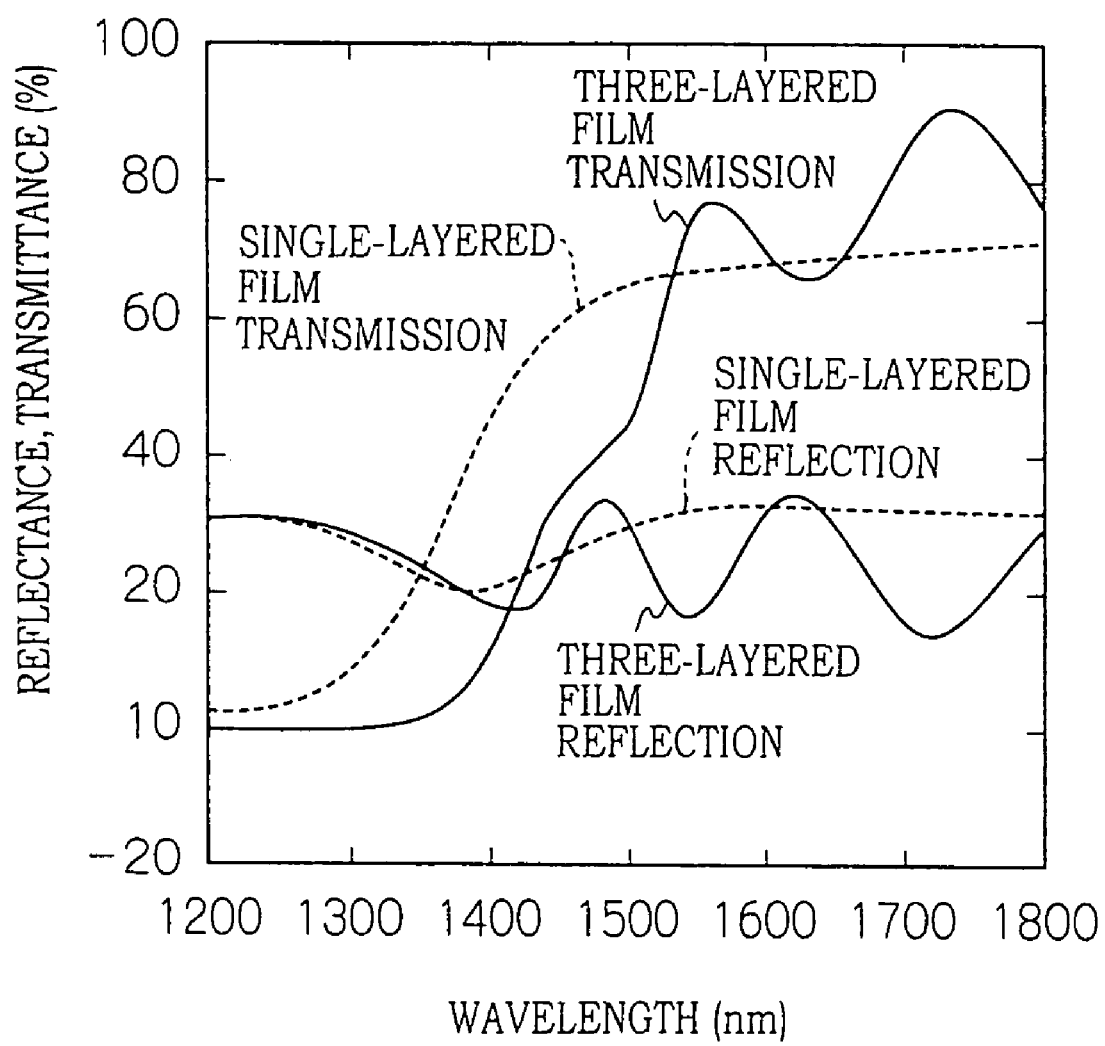
FIG. 10 is a graph showing the transmission spectrum and the reflection spectrum of the single-layered and three-layered films.

The transmission and reflection spectrums of the multi-layered film containing three layers of the BM4i4i film disposed between the GeO films are shown in FIG. 10 together with the spectrum containing a single layer of the BM4i4i film.

In the case of the single layer, the transmission spectrum and reflection spectrum are flat in a transparent region where BM4i4i film has virtually no absorption. On the other hand, in the case of the multilayered film having three layers, a periodic structure appears in this region. The interface reflection due to the difference in refractive index between the BM4i4i film and the GeO film is 1%, which is too small to cause interference. The intervals of the periodic structure seem to indicate that this is probably the result of the interference of the reflective light from the film surface and the glass substrate surface. Accordingly, it can be concluded that the GeO film has small optical influence and the effect of the inside multiple reflection can be minimized.

On the other hand, when the difference in refractive index between the materials composing the multilayered structure is larger, the amplitude of the periodic structure increases. This makes it advantageous to actively utilize the interference effect. In other words, in the periodic structure shown in FIG. 10, the wavelengths of the signal light and the control light can be set to have a minimum reflectance so as to reduce the loss due to reflection of these lights, whereby high throughput and high switching efficiency can be obtained.

For example, in the case of a three-layered film in which the GeO film is replaced by the $CaF_2$ film (refractive index: 1.22), the amplitude of the periodic structure becomes about three times that of the multilayered film comprising the BM4i4i film and the GeO film. By optimizing the film thicknesses of the BM4i4i film and the $CaF_2$ film, the signal light can be set at 1550 nm, and the control light can be set at 1630 nm, whereby the conditions are met to actively utilize the interference effect. When optical switching was actually performed under the same conditions, 80% improvement in switching efficiency over the case in which the conditions are not met was verified.

The invention has been explained in the above, and the features of the optical switching device of the invention can be summarized as follows:

First, the cost of the element can be extremely low. To be more specific, organic film can generally be supplied at low cost by mass synthesis and the production process of the element can be carried out inexpensively, so that the optical element is expected to be able to be produced at lower cost than semiconductor materials.

Second, the material is amorphous and does not need high-temperature process for film formation unlike semiconductor material. This can thus reduce constraints to the substrate materials, and it is possible to dispose an optical switching film on materials or components on which it has been difficult to form the film. In particular, it is possible to provide a flexible optical switching film which has been difficult to produce from conventional materials.

Third, film with a large area can be obtained easily. With conventional semiconductor materials, although it is possible to enlarge the film size to some extent, it has been necessary to introduce a large vacuum device, leading to extremely high production cost. Since it is easier to produce an optical switch having a large area, there is a possibility of realizing an optical device based on a new operating mechanism.

As described above, the optical switching device of the invention can provide properties at levels the same or higher than the conventional semiconductor optical switches. At the same time, the optical switching device of the invention has features that cannot be achieved by the conventional optical switching devices, thereby providing extremely high commercial values. FIG. 1 in the examples only shows a basic structure for the purpose of explaining the mechanism. The scope of the invention is by no means limited to the structure of the examples but includes all kinds of optical switching devices and their equivalents produced based on the principle and materials described in the present specification.

What is claimed is:

1. An optical switching device comprising a substrate and at least an organic film as a light control part formed on the substrate,
   wherein optical switching is performed by applying signal light and control light to the organic film, the wavelengths of the signal light and the control light being set in a spectral region on the longer wavelength side in the absorption spectrum of the organic film where the absorbance is not more than 0.3; and by changing a real part or real and imaginary parts of the refractive index of the light control part by using the control light, to thereby cause a phase difference in the signal light.

2. The optical switching device of claim 1, wherein the organic film comprises a compound represented by the following formula (I):

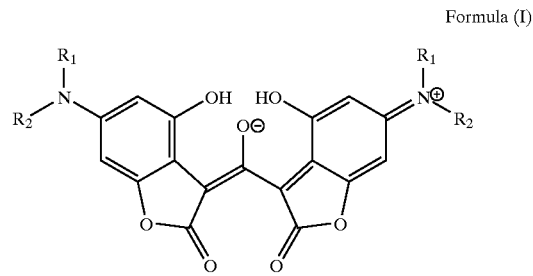

Formula (I)

wherein $R_1$ and $R_2$ each independently represent a straight-chain alkyl group or a branched alkyl group.

3. The optical switching device of claim 2, wherein the optical switching is performed by setting the wavelengths of the signal light and the control light in a wavelength region which does not actually excite an electron in the compound represented by formula (I) contained in the organic film.

4. The optical switching device of claim 2, wherein center wavelengths of the signal light and the control light are set to 1480 nm or more.

5. The optical switching device of claim 2, wherein the organic film is formed by spin coating of a solution containing an organic solvent and the compound represented by formula (I) dissolved therein.

6. The optical switching device of claim 1, wherein the optical switching is performed by arranging a pair of polarizers, whose polarization directions are orthogonal to each other, on both sides of the organic film in the optical path of the signal light, when the refractive index of the light control part is changed by the control light, thereby causing a phase difference in the signal light.

7. The optical switching device of claim 1, wherein the signal light and the control light are optical pulses having a time width in a range of $10^{-12}$ to $10^{-13}$ seconds.

8. The optical switching device of claim 1, wherein the light control part is a multilayered film comprising the organic film and a dielectric film.

9. The optical switching device of claim 8, wherein a difference between a refractive index of the dielectric film and a refractive index of the organic film is within a range of 0 to 0.5.

10. The optical switching device of claim 8, wherein a difference between a refractive index of the dielectric film and a refractive index of the organic film is within a range of 0.5 to 1.8.

11. The optical switching device of claim 10, wherein a center wavelength of the signal light and/or the control light is set in the vicinity of a wavelength region where reflectance is minimized and/or transmittance is maximized due to an interference effect deriving from the multilayered film.

12. The optical switching device of claim 8, wherein the organic film comprises a compound represented by the following formula (I), and the dielectric film is at least one of an organic dielectric film and an inorganic dielectric film:

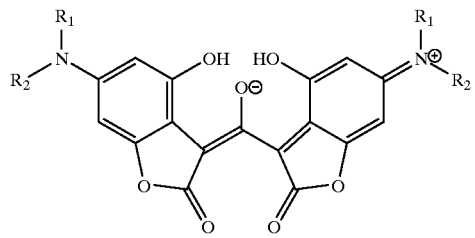

Formula (I)

wherein $R_1$ and $R_2$ each independently represent a straight-chain alkyl group or a branched alkyl group.

13. The optical switching device of claim 12, wherein the dielectric film comprises at least one inorganic dielectric film selected from a GeO film, a $MgF_2$ film, a $CaF_2$ film, and a SiO film.

14. The optical switching device of claim 12, wherein the organic film is formed by spin coating of a solution containing an organic solvent and the compound represented by formula (I) dissolved therein.

15. The optical switching device of claim 8, wherein the dielectric film is an inorganic dielectric film formed by vacuum deposition.

16. The optical switching device of claim 8, wherein the dielectric film is an organic dielectric film formed by spin coating of a solution containing an organic solvent and organic polymer material dissolved therein.

17. The optical switching device of claim 1, wherein the signal light and the control light are condensed to the light control part by a light-focusing means.

18. The optical switching device of claim 17, wherein a diameter of a focal point is in a range of 3 to 10 μm when the signal light and the control light are condensed to the light control part.

19. The optical switching device of claim 1, wherein the light control part is divided into independent plural sections where light control is performed in parallel.

20. The optical switching device of claim 1, wherein the substrate is a flexible film.

21. An optical device comprising the optical switching device of claim 20 which is disposed in contact with at least one of an optical input part and an optical output part of an optical element.

22. An optical device comprising at least an organic film as a light control part formed at at least one of an optical input part and an optical output part of an optical element, wherein optical switching is performed by applying signal light and control light to the organic film, the wavelengths of the signal light and the control light being set in a spectral region on the longer wavelength side in the absorption spectrum of the organic film where the absorbance is not more than 0.3; and by changing a real part or real and imaginary parts of the refractive index of the light control part by using the control light, to thereby cause a phase difference in the signal light.

23. An optical switching process comprising:
applying signal light and control light to an organic film formed on a substrate as a light control part, the wavelengths of the signal light and the control light being set in a spectral region on the longer wavelength side in the absorption spectrum of the organic film where the absorbance is not more than 0.3, wherein optical switching is performed by changing a real part or real and imaginary parts of the refractive index of the light control part by using the control light, to thereby cause a phase difference in the signal light.

* * * * *